(12) United States Patent
Li et al.

(10) Patent No.: US 11,836,253 B2
(45) Date of Patent: Dec. 5, 2023

(54) MALICIOUS FILE DETECTION METHOD, DEVICE, AND SYSTEM

(71) Applicant: Huawei Technologies Co., Ltd., Shenzhen (CN)

(72) Inventors: Li Li, Shenzhen (CN); Bingjian Zhao, Beijing (CN); Zehao Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 693 days.

(21) Appl. No.: 17/030,984

(22) Filed: Sep. 24, 2020

(65) Prior Publication Data

US 2021/0026959 A1 Jan. 28, 2021

Related U.S. Application Data

(63) Continuation of application No. PCT/CN2019/077025, filed on Mar. 5, 2019.

(30) Foreign Application Priority Data

Mar. 26, 2018 (CN) .......................... 201810253814.4

(51) Int. Cl.
*H04L 29/06* (2006.01)
*H04L 12/26* (2006.01)
(Continued)

(52) U.S. Cl.
CPC ........ *G06F 21/565* (2013.01); *G06F 9/45558* (2013.01); *H04L 47/2483* (2013.01);
(Continued)

(58) Field of Classification Search
CPC ............... G06F 21/565; G06F 9/45558; H04L 47/2483; H04L 67/02
(Continued)

(56) References Cited

U.S. PATENT DOCUMENTS 7,343,398 B1 * 3/2008 Lownsbrough ....... H04L 63/166
709/229
8,990,944 B1 * 3/2015 Singh ...................... G06F 21/53
726/24
(Continued)

FOREIGN PATENT DOCUMENTS

CN 101465770 A 6/2009
CN 102663281 A 9/2012
(Continued)

*Primary Examiner* — Haresh N Patel
(74) *Attorney, Agent, or Firm* — Conley Rose, P.C.

(57) ABSTRACT

A detection device runs a first sample file in a first virtual operating environment, when the first sample file sends a first Hypertext Transfer Protocol (HTTP) request to a server, the detection device obtains an identifier of the first sample file and a first data flow identifier correspondingly from the first HTTP request. The detection device obtains a second data flow identifier and a second sample file carried in subsequently transmitted data flow. If the second data flow identifier is the same as the first data flow identifier in the correspondence, the detection device determines that the second sample file is a subsample file of the first sample file, detects the second sample file to obtain a detection result of the second sample file, and determines, based on the detection result of the second sample file, that the first sample file is a malicious file.

20 Claims, 8 Drawing Sheets

(51) Int. Cl.
*G06F 21/56* (2013.01)
*G06F 9/455* (2018.01)
*H04L 47/2483* (2022.01)
*H04L 67/02* (2022.01)

(52) U.S. Cl.
CPC .... *H04L 67/02* (2013.01); *G06F 2009/45579* (2013.01); *G06F 2009/45595* (2013.01)

(58) Field of Classification Search
USPC .......................................................... 726/24
See application file for complete search history.

(56) References Cited

U.S. PATENT DOCUMENTS

| | | | |
|---|---|---|---|
| 9,241,010 B1 | 1/2016 | Bennett et al. | |
| 9,635,039 B1* | 4/2017 | Islam | H04L 63/145 |
| 9,654,487 B2* | 5/2017 | Boutnaru | H04L 63/1416 |
| 9,917,855 B1 | 3/2018 | Li et al. | |
| 2010/0281051 A1* | 11/2010 | Sheffi | H04L 67/5651 |
| | | | 707/E17.014 |
| 2012/0030193 A1* | 2/2012 | Richberg | G06Q 10/10 |
| | | | 707/719 |
| 2015/0007312 A1* | 1/2015 | Pidathala | H04L 63/1433 |
| | | | 726/22 |
| 2017/0264640 A1* | 9/2017 | Narayanaswamy | |
| | | | H04L 63/0281 |
| 2017/0318045 A1* | 11/2017 | Johns | H04L 63/168 |
| 2017/0357813 A1 | 12/2017 | Petersen et al. | |
| 2018/0048658 A1* | 2/2018 | Hittel | G06F 21/565 |

FOREIGN PATENT DOCUMENTS

| | | | |
|---|---|---|---|
| CN | 102750475 A | | 10/2012 |
| CN | 105187392 A | | 12/2015 |
| CN | 105681250 A | | 6/2016 |
| CN | 105915516 A | | 8/2016 |
| CN | 106055975 A | | 10/2016 |
| CN | 106778268 A | * | 5/2017 |
| CN | 106953860 A | | 7/2017 |
| CN | 107634964 A | | 1/2018 |

* cited by examiner

| Name | Value |
|---|---|
| GET | /test/test.html HTTP/1.1 |
| Host | 1.1.1.1:3000 |
| User-Agent | Mozilla/5.0 (Windows NT 6.1; WOW64; rv:30.0) Gecko/20100101 Firefox/30.0 |
| Accept | text/html,application/xhtml+xml,application/xml;q=0.9,*/*;q=0.8 |
| Accept-Language | zh-cn,zh;q=0.8,en-us;q=0.5,en;q=0.3 |
| Accept-Encoding | gzip, deflate |
| X-Requested-With | XMLHttpRequest |
| Connection | keep-alive |
| MD5 | 02857a690225a12ba703bea6deea2217 |

FIG. 6

MALICIOUS FILE DETECTION METHOD, DEVICE, AND SYSTEM

CROSS-REFERENCE TO RELATED APPLICATION

This application is a continuation of International Patent Application No. PCT/CN2019/077025 filed on Mar. 5, 2019, which claims priority to Chinese Patent Application No. 201810253814.4 filed on Mar. 26, 2018, both of which are hereby incorporated by reference in their entireties.

TECHNICAL FIELD

This application relates to the field of computer and network technologies, and in particular, to a malicious file detection method, device, and system.

BACKGROUND

A malicious file is a file that includes a segment of programs written by a program designer for an attack purpose. The malicious file exploits vulnerability of a computer system to execute malicious tasks such as stealing confidential information and damaging stored data. The malicious file is usually an executable file such as a virus, a worm, or a Trojan horse program that executes malicious tasks in the computer system.

Because the malicious file may severely damage security of the computer system, how to detect the malicious file is an important research subject of network security defense technologies. For example, current mainstream malicious file detection technologies include antivirus engine scanning, static detection, machine learning-based file type identification, and dynamic behavior detection. To comprehensively and accurately reflect impact and damage caused by a sample file on the computer system as much as possible, a detection device usually analyzes the sample file using the foregoing plurality of detection technologies at the same time.

An antivirus engine is a program used to check whether a file is a virus. In this application, a to-be-detected file is referred to as a sample file. The antivirus engine scanning means that the antivirus engine compares a sample file with a feature of a discovered virus stored in an antivirus database, and determines, based on a comparison result, whether the sample file is a virus. The machine learning-based file type identification means that a classification model (for example, a state machine) is obtained through learning from a large quantity of known normal files and a large quantity of known malicious files based on a machine learning algorithm. The detection device inputs a sample file into the classification model, and the classification model may output a probability that the sample file is a malicious file. The detection device determines, based on the probability and some other reference thresholds, whether the sample file is a malicious file.

The static detection is a method for performing program analysis without running a computer program. For example, whether the sample file is a malicious file is checked through analysis of source code, assembly, syntax, a structure, a process, and an interface of a sample file.

The dynamic behavior detection means that an execution process of a sample file is simulated, to obtain behavior or a behavior sequence that is generated in the execution process of the sample file, the behavior or the behavior sequence is matched with a dynamic behavior feature of a known malicious file, and it is determined, based on a matching result, whether the sample file is a malicious file. The dynamic behavior detection is usually implemented using a sandbox technology. A sandbox is a security mechanism that provides a virtual operating environment to provide an isolation environment for a sample file that is being executed. A program that is run in the sandbox cannot affect hardware permanently. The sandbox may be implemented by a real operating system of a host, or may be implemented by a virtual machine. To collect behavior or a behavior sequence that is generated in a running process of a sample file, a monitoring program needs to be added to the sandbox. In a virtual machine of a WINDOWS operating system, a monitoring program is usually added using a driver framework provided by MICROSOFT, and the monitoring program monitors behavior such as process creation, document creation, and registration entry modification.

To evade detection, some current malicious files implant a simple script file or executable (exe) file into a target host using a mail, a web page, and the like. When the simple script file or executable file is run, a remote server is accessed using the Hypertext Transfer Protocol (HTTP), to download a real malicious file from the remote server. When detecting these malicious files, the detection device needs to detect both a script file or an executable file and a file downloaded by the script file or the executable file, to achieve an accurate detection effect.

However, limited by an operating environment, an existing detection technology usually cannot achieve an ideal detection effect. For brevity of description, in this application, the script file or the executable file that is implanted first in the foregoing example is referred to as a parent sample file, and the file that is downloaded subsequently from the remote server is referred to as a subsample file. When the sandbox is implemented based on the virtual machine, a behavior sequence of the subsample file may be obtained only when the subsample file and the parent sample file can be run in a same virtual machine. When a scheduling mechanism in the detection device allocates a virtual machine required for execution to the parent sample file, the virtual machine allocated to the parent sample file may be a 32-bit operating environment. However, the subsample file can be run only in a 64-bit operating environment. After the virtual machine running the parent sample file downloads the subsample file, the subsample file cannot be run because the operating environments do not match. In this case, the virtual machine cannot monitor the behavior sequence of the subsample file. Therefore, it cannot be detected that a sample file including the parent sample file and the subsample file is a malicious file. In addition, because the subsample file is not allocated by the scheduling mechanism to a function module configured to implement static detection, an antivirus engine, and a machine learning-based file type identification module for detection, a final detection effect is also affected.

SUMMARY

Embodiments of this application provide a malicious file detection method, to improve accuracy of malicious file detection.

According to a first aspect, a malicious file detection method is provided, including the following.

A detection device runs a first sample file in a first virtual operating environment on the detection device.

When the first sample file sends a first HTTP request to a server, the detection device obtains an identifier of the first sample file and a first data flow identifier, where the first HTTP request is used to request a subsample file from the server, the identifier of the first sample file is generated by the first virtual operating environment for the first sample file, and the first data flow identifier is a data flow identifier of the first HTTP request.

The detection device stores a correspondence between the identifier of the first sample file and the first data flow identifier.

The detection device obtains a subsequently transmitted data flow between the first virtual operating environment and the server.

The detection device obtains, from the subsequently transmitted data flow, a second data flow identifier and a second sample file carried in the subsequently transmitted data flow, where the second data flow identifier is an identifier of the subsequently transmitted data flow.

If the second data flow identifier is the same as the first data flow identifier in the correspondence, the detection device determines that an association relationship is that the second sample file is a subsample file of the first sample file identified by the identifier of the first sample file in the correspondence.

The detection device detects the second sample file to obtain a detection result of the second sample file.

The detection device determines, based on the association relationship and the detection result of the second sample file, that the first sample file is a malicious file.

After running the first sample file in the first virtual operating environment, the detection device intercepts an HTTP request carrying the identifier of the first sample file, to establish a correspondence between a data flow identifier of the HTTP request and the identifier of the first sample file. The correspondence is used to identify, from the subsequently transmitted data flow between the first virtual operating environment and the server, the subsample file requested by the first sample file. The detection device detects the subsample file, and determines, based on a detection result of the subsample file, whether a parent sample file is a malicious file such that a malicious file including a parent sample file and a subsample file can be accurately identified. This reduces a possibility that the malicious file evades detection, and improves accuracy of malicious file detection.

In a possible implementation, that the detection device detects the second sample file to obtain a detection result of the second sample file includes the following.

The detection device runs the second sample file in a second virtual operating environment, to obtain a behavior sequence generated by running the second sample file. The first sample file and the second sample file are separately run in different virtual environments. Therefore, the behavior sequence generated by running the second sample file serving as a subsample file in a proper virtual operating environment is associated with the first sample file serving as a parent sample file such that whether the first sample file is a malicious file can be more comprehensively determined from the perspective of dynamic behavior detection. This improves accuracy of detecting a malicious file including a parent sample file and a subsample file.

In another possible implementation, that the detection device detects the second sample file to obtain a detection result of the second sample file includes the following.

The detection device performs parallel detection on the second sample file, and records a parallel detection result of the second sample file, where the parallel detection includes at least one of static detection, antivirus engine scanning, or machine learning-based file type identification. A static detection result of the second sample file serving as a subsample file is associated with the first sample file serving as a parent sample file such that a detection parameter that can reflect file maliciousness can be obtained more comprehensively. This improves accuracy of detecting a malicious file including a parent sample file and a subsample file.

In another possible implementation, that the detection device detects the second sample file to obtain a detection result of the second sample file may alternatively be performing dynamic behavior detection and parallel detection on the second sample file, and subsequently detecting, based on the behavior sequence generated by running the second sample file and a parallel detection result of the second sample file, whether the first sample file serving a parent sample file is a malicious file. A dynamic behavior detection result and a static detection result of the second sample file serving as a subsample file are associated with the first sample file serving as a parent sample file such that a detection parameter that can reflect file maliciousness can be obtained more comprehensively. This improves accuracy of detecting a malicious file including a parent sample file and a subsample file.

In another possible implementation, the detection device and the server are interconnected using a switch, and that the detection device obtains a subsequently transmitted data flow between the first virtual operating environment and the server includes the following.

The detection device receives mirrored traffic that is of subsequently transmitted traffic between the first virtual operating environment and the server and that is sent by the switch, and obtains the subsequently transmitted data flow from the mirrored traffic.

In another possible implementation, the first virtual operating environment is a first virtual machine, the second virtual operating environment is a second virtual machine, the first virtual machine receives the first HTTP request, and generates a second HTTP request based on the first HTTP request, and the second HTTP request includes the first HTTP request and the identifier of the first sample file, and that the detection device obtains an identifier of the first sample file and a first data flow identifier includes the following.

The detection device receives the second HTTP request using a virtual machine monitor (VMM).

The detection device obtains the identifier of the first sample file and the first data flow identifier from the second HTTP request.

In this implementation, to enable a format of an HTTP request received by the server to comply with an existing format requirement to improve a response success rate of the server, the detection device may further delete the identifier of the first sample file in the second HTTP request after obtaining the identifier of the first sample file and the first data flow identifier, to restore the first HTTP request, and send the restored first HTTP request to the server.

In another possible implementation, the first virtual operating environment is a first virtual machine, the second virtual operating environment is a second virtual machine, the first virtual machine receives the first HTTP request, generates a second HTTP request based on the first HTTP request, and sends the second HTTP request to the server using the switch, and the second HTTP request includes the first HTTP request and the identifier of the first sample file, and that the detection device obtains an identifier of the first sample file and a first data flow identifier includes the following.

The detection device receives a mirrored packet that is of the second HTTP request and that is sent by the switch.

The detection device obtains the identifier of the first sample file and the first data flow identifier from the mirrored packet of the second HTTP request.

In the foregoing implementation, the identifier of the first sample file that is carried in the second HTTP request is added by an HTTP proxy module in the first virtual machine. The identifier of the first sample file is added to the first HTTP request such that the detection device can establish an association relationship between a subsample file and a parent sample file using an identifier of a data flow as an index in a subsequent procedure.

In another possible implementation, before the detection device runs the first sample file in the first virtual operating environment, the method further includes the following. The detection device allocates the first sample file to the first virtual operating environment based on an extension and/or file header information of the first sample file. Before the detection device runs the second sample file in the second virtual operating environment, the method further includes the following. The detection device allocates the second sample file to the second virtual operating environment based on an extension and/or file header information of the second sample file. Using the foregoing allocation mechanism, the detection device can ensure that a sample file is run in a proper operating environment, to improve a success rate of obtaining a dynamic behavior feature of a subsample file, and further improve accuracy of subsequently detecting a malicious file including a parent sample file and a subsample file based on the dynamic behavior feature of the subsample file.

In the first aspect or any possible implementation of the first aspect, the first sample file and the second sample file each are an executable file or a file into which an executable file is embedded such that preset functions can be completed after the first sample file and the second sample file are executed.

In the first aspect or any possible implementation of the first aspect, the first virtual operating environment may be the same as the second virtual operating environment, or may be different from the second virtual operating environment. The detection device individually allocates a proper virtual operating environment to a subsample file such that it can be ensured that a behavior sequence generated in a running process of the subsample file can be obtained. This improves accuracy of malicious file detection.

According to a second aspect, a detection device is provided, including a memory, a network interface, and at least one processor. The memory, the network interface, and the at least one processor are connected to each other using a bus.

The memory is configured to store program code.

The at least one processor is configured to, after reading the program code stored in the memory, perform the method in the first aspect or any possible implementation of the first aspect. For details, refer to the foregoing detailed descriptions. Details are not described herein again.

According to a third aspect, a malicious file detection apparatus is provided, to perform the method in the first aspect or any possible implementation of the first aspect. Specifically, the malicious file detection apparatus includes units configured to perform the method in the first aspect or any possible implementation of the first aspect. These units may be implemented by program modules, or may be implemented by hardware or firmware. For details, refer to detailed descriptions in the embodiments. Details are not described herein.

According to a fourth aspect, an embodiment of this application provides a computer-readable storage medium configured to store a computer software instruction used by the foregoing detection device. When the computer software instruction is run on a computer, the computer is enabled to perform the method in the first aspect or any possible implementation of the first aspect.

According to a fifth aspect, an embodiment of this application provides a computer program product including an instruction. When the computer program product is run on a computer, the computer is enabled to perform the method in the first aspect or any possible implementation of the first aspect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 6 is a schematic diagram of field content of an HTTP request carrying an identifier of a first sample file according to an embodiment of this application.

DESCRIPTION OF EMBODIMENTS

With reference to the accompanying drawings, the following describes in detail implementation principles, specific implementations, and corresponding achievable beneficial effects of the technical solutions of the present disclosure.

Apparently, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

With reference to the accompanying drawings, the following describes in detail main implementation principles, specific implementations, and corresponding achievable beneficial effects of the technical solutions of the embodiments of the present disclosure.

Figure 1:
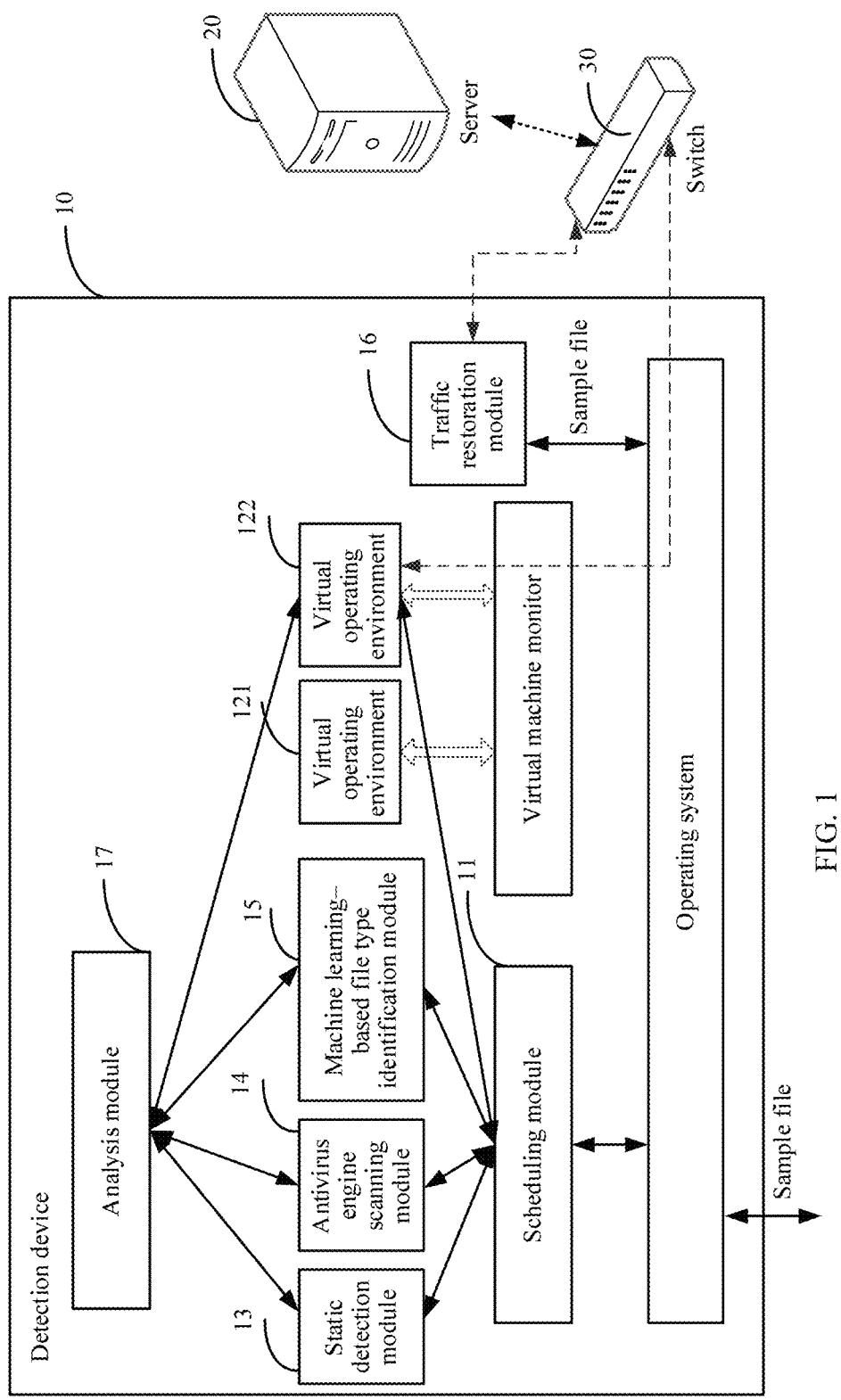
FIG. 1 is a schematic diagram of an application scenario of a malicious file detection method according to an embodiment of this application.

FIG. 1 is a schematic diagram of an application scenario of a malicious file detection method according to an embodiment of this application. A detection device 10 implements data communication with a server 20 using a switch 30. Optionally, the detection device 10 and the switch 30 are located in a local area network, the server 20 is located in the internet, and a communication link between the switch 30 and the server 20 may further include packet forwarding devices such as a firewall, a network address translation (NAT) device, a gateway, and a router. Optionally, the server 20 is a server that can be accessed using the internet and that provides a sample file, for example, a web server or a File Transfer Protocol (FTP) server.

The detection device in this embodiment of this application is a security device having a network access function. Optionally, the security device is an independent sandbox device or another network device into which a sandbox function is integrated, for example, a security gateway or a firewall. The independent sandbox device is usually deployed at an internet egress of an enterprise in a bypass manner. For example, an area network of the enterprise is connected to the internet using a gateway device or a router, and the sandbox device is connected to the gateway device or the router in a bypass manner.

To better understand a working principle of the detection device, functions implemented by the detection device 10 are described in a manner of describing a logical module in this embodiment of this application. The detection device 10 in FIG. 1 includes a scheduling module 11, at least two virtual operating environments (for example, a first virtual operating environment 121 and a second virtual operating environment 122), a static detection module 13, an antivirus engine scanning module 14, a machine learning-based file type identification module 15, a traffic restoration module 16, and an analysis module 17.

In this embodiment of this application, the virtual operating environment is a sandbox. Specifically, the virtual operating environment is isolated from a real operating environment of a host, a browser or another program is allowed to be run in the virtual operating environment, and a change generated by running the browser or the other program may be deleted subsequently. A program that is run in the virtual operating environment cannot affect a hard disk permanently. The virtual operating environment may be used to test an untrusted application program or untrusted online behavior. For brevity, only two virtual operating environments 121 and 122 are used as an example for description in FIG. 1. A principle of implementing the solution provided in the embodiments of this application when the detection device 10 includes more virtual operating environments is similar to that of the two virtual operating environments. In this embodiment of this application, a plurality of different virtual operating environments are preconfigured on the detection device 10, to adapt to running requirements of sample files with different requirements. In addition, a plurality of different virtual operating environments are configured such that a plurality of sample files can be detected in parallel, improving detection efficiency. A configuration parameter varies with a virtual operating environment. The configuration parameter includes an operating system type, an operating system version, a quantity of bits of an operating system, a version number of installed application software, and the like. The operating system type includes a common WINDOWS operating system and a common LINUX operating system. The WINDOWS operating system is used as an example. The operating system version includes WINDOWS 2000, WINDOWS 2003, WINDOWS 7, WINDOWS 8, and the like. A common quantity of bits of an operating system includes 32 bits and 64 bits. The application software installed in the virtual operating environment also affects running of a sample file.

Optionally, the virtual operating environment may be implemented using a professional software product, or may be implemented using a virtual machine. If the sandbox is implemented using a virtual machine, the virtual operating environments 121 and 122 in FIG. 1 are two virtual machines. In the following embodiments, an example in which the virtual operating environment is a virtual machine is used for description. In an embodiment, the first virtual operating environment 121 is a virtual machine 121, and the second virtual operating environment 122 is a virtual machine 122.

A plurality of virtual machines on the detection device 10 are implemented based on a VMM. The VMM is also referred to as a hypervisor, is software, firmware, or hardware that creates and runs the virtual machines, and allows a plurality of operating systems and applications to share one set of physical hardware. A host machine is a host configured to provide physical hardware for the virtual machines for running. For example, if several virtual machines are run based on physical hardware of one host, the host is a host machine of the several virtual machines. The VMM is run between the physical hardware of the host machine and the virtual machine. A host machine in FIG. 1 is the detection device 10. The VMM may be run between the physical hardware of the host machine and an operating system of the host machine, or may be run between an operating system of the host machine and the virtual machine. This is not limited in this application. An example in which the VMM is run between the operating system of the host machine and the virtual machine is merely used for description in FIG. 1.

The scheduling module 11, the static detection module 13, the antivirus engine scanning module 14, the machine learning-based file type identification module 15, the traffic restoration module 16, and the analysis module 17 may be implemented using software, that is, a function module generated after a processor of the detection device 10 reads program code stored in a memory. Apparently, the foregoing logical modules in the detection device 10 may also be combined or split without affecting an overall function of the detection device.

Figure 2:
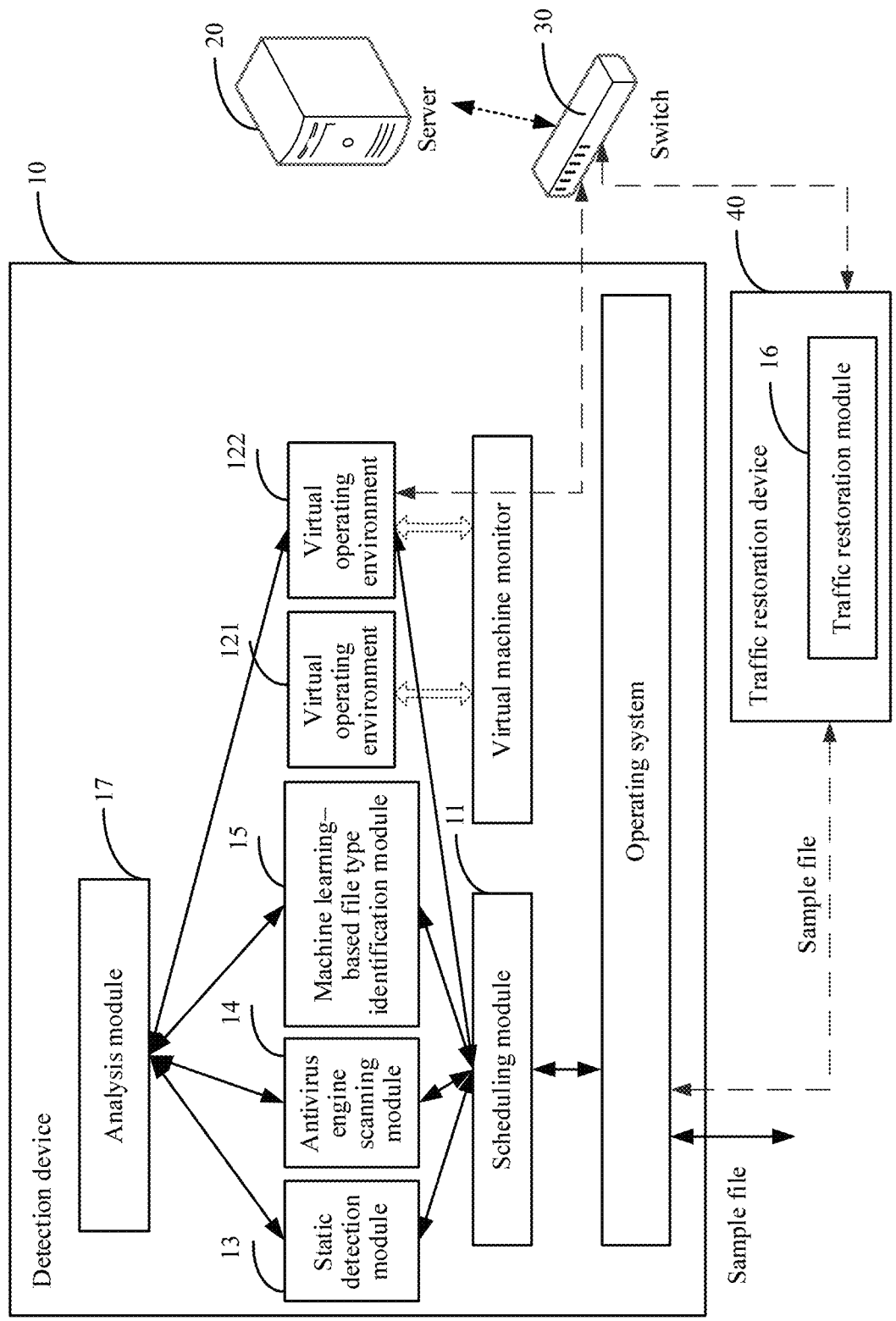
FIG. 2 is a schematic diagram of another application scenario of a malicious file detection method according to an embodiment of this application.

Optionally, as shown in FIG. 1, the traffic restoration module 16, the scheduling module 11, the static detection module 13, the antivirus engine scanning module 14, the machine learning-based file type identification module 15, the virtual machine 121, the virtual machine 122, and the analysis module 17 may be integrated into a same host, that is, all belong to the detection device 10. The traffic restoration module 16 may alternatively be implemented by another independent device. In other words, the detection device 10 includes the scheduling module 11, the static detection module 13, the antivirus engine scanning module 14, the machine learning-based file type identification module 15, the virtual machine 121, the virtual machine 122, and the analysis module 17. The traffic restoration module 16 is implemented by a logical module in another device, and the other device is a traffic restoration device 40 in FIG. 2. The traffic restoration device 40 is a host specially configured to perform traffic restoration. A relationship between the traffic restoration device and the detection device is shown in FIG. 2.

The scheduling module 11 is configured to receive a sample file. The sample file may be entered by an administrator using an input interface of the detection device, or may be submitted by the traffic restoration module 16. The scheduling module 11 identifies a file type of the sample file based on an extension and/or file header information of the sample file, determines an operating environment required by the sample file, and sends the sample file to a virtual machine that can provide the operating environment required by the sample file for running.

In this embodiment of this application, the sample file is an executable file or a file into which an executable file is embedded. Optionally, in the WINDOWS operating system, the executable file includes an ".exe" file, a portable executable (PE) file, and various script files. The script file is, for example, a script file compiled by a MICROSOFT VISUAL BASIC (VB) Script Editor (VBS). Another type of file into which an executable file is embedded may be, for example, an e-mail file that carries an executable file as an attachment, or a word document file into which an executable file is embedded. For the other type of file into which an executable file is embedded, running of the embedded executable file not only depends on an operating system type, an operating system version, and a quantity of bits of an operating system, but also depends on application software installed in a virtual operating environment. For example, for an e-mail file that carries an executable file as an attachment and a word document file into which an executable file is embedded, a MICROSOFT Office software package needs to be installed in the virtual operating environment. Optionally, in the LINUX operating system, the executable file includes an ".elf" file, a shell script, and the like.

Optionally, the scheduling module 11 determines the file type of the sample file in a plurality of manners. For example, the scheduling module 11 identifies the file type of the sample file based on the file header information. Specifically, the scheduling module 11 prestores data structures of file headers (or files) of various file types. After receiving the sample file, the scheduling module 11 sequentially compares the file header of the sample file with the data structures of the file headers of the various file types, to obtain a data structure conforming to the file header of the sample file, and uses a file type corresponding to the data structure as the file type of the sample file. In addition, the scheduling module 11 may directly identify the file type of the sample file based on the extension.

Further, the scheduling module 11 determines, based on the identified file type of the sample file, the operating environment required by the sample file. Optionally, the scheduling module 11 prestores a mapping relationship between a file type and a virtual operating environment, and queries the mapping relationship to determine the operating environment required by the sample file for running. The mapping relationship is shown in Table 1. The virtual machine 121 and the virtual machine 122 in Table 1 are shown in FIG. 1 or FIG. 2. A virtual machine 123 in Table 1 is not shown in FIG. 1 or FIG. 2.

TABLE 1

| Sequence number | Search index | Identifier of the virtual operating environment | Configuration parameter of the virtual operating environment |
|---|---|---|---|
| 1 | .vbs | Virtual machine 121 | WINDOWS 2000/32 bits/Office 2000 |
| 2 | .exe | Virtual machine 122 | WINDOWS 2007/64 bits/ |
| 3 | .elf | Virtual machine 123 | LINUX/32 bits |
| 4 | shell | Virtual machine 123 | LINUX/32 bits |

For example, the scheduling module 11 determines, through extension comparison, that a sample file is an ".elf" file, learns, by searching Table 1, that an operating environment required by ".elf" is a virtual machine of a 32-bit LINUX operating system, and sends the sample file to the virtual machine 123 for running.

Optionally, the scheduling module 11 may alternatively determine, based on specified field content in the file header of the sample file, the operating environment required by the sample file for running. For example, the scheduling module 11 determines, through comparison, that the sample file conforms to a data structure of a file header of a PE file, and therefore determines that the file type of the sample file is the PE file. Then, the scheduling module 11 reads a PE optional header of the sample file. If a definition of the PE optional header is IMAGE_OPTIONAL_HEADER32, the sample file requires a 32-bit WINDOWS operating environment. If a definition of the PE optional header is IMAGE_OPTIONAL_HEADER64, the sample file requires a 64-bit WINDOWS operating environment.

Optionally, the scheduling module 11 may allocate the matched virtual machine to the sample file in the foregoing manner, to obtain a behavior sequence generated in a running process of the sample file. In addition, the scheduling module 11 may further separately distribute the sample file to the static detection module 13, the antivirus engine scanning module 14, and the machine learning-based file type identification module 15 for detection.

The static detection module 13 is configured to perform analysis without running the sample file, for example, analyze source code, assembly, syntax, a structure, a process, and an interface of the sample file, to check whether the sample file is a malicious file.

The antivirus engine scanning module 14 is configured to compare the sample file with a feature of a discovered malicious file stored in an antivirus database, and determine, based on a comparison result, whether the sample file is a malicious file.

The machine learning-based file type identification module 15 is configured to obtain a classification model (for example, a state machine) through learning from a large quantity of known normal files and a large quantity of known malicious files in advance, and determine, based on the classification model obtained through learning, whether the sample file is a malicious file.

The virtual machine 121 or the virtual machine 122 is configured to run the sample file, and obtain a behavior sequence generated in a running process of the sample file. The behavior sequence includes one or more pieces of behavior. Optionally, the behavior sequence is generated by sorting the one or more pieces of behavior in chronological order. In this application, behavior of the sample file in the virtual operating environment includes one or more of a process operation, a file operation, a registration entry operation, port access, dynamic link library (DLL) release or loading, and the like. The process operation includes process creation and/or process termination. The file operation includes one or more of file creation, file modification, file reading, file deletion, and the like. The registration entry operation includes one or more of registration entry creation, registration entry modification, registration entry query, registration entry deletion, and the like.

As shown by dashed lines in FIG. 1, after being processed by the VMM and the operating system, a packet exchanged between the sample file and another network device in a running process in the virtual machine 122 is forwarded using a network interface of the detection device. A process in which a packet is generated by running the sample file in the virtual machine 121 is not shown in FIG. 1.

Apparently, similar to the static detection module 13, the antivirus engine scanning module 14, the machine learning-based file type identification module 15, the virtual machine 121, and the virtual machine 122, there may be other malicious file detection manners, which are not listed one by one herein.

The traffic restoration module 16 is configured to perform packet parsing and traffic restoration on mirrored traffic sent by the switch, to obtain information carried in a packet or a file carried in a data flow.

The analysis module 17 is configured to analyze and summarize detection results obtained by the static detection module 13, the antivirus engine scanning module 14, the machine learning-based file type identification module 15, the virtual machine 121, and the virtual machine 122, and generate a summary result. The summary result is used to indicate whether the sample file is a malicious file, or indicate a probability that the sample file is a malicious file.

In an implementation, the switch in FIG. 1 and FIG. 2 is provided with a traffic mirroring function. The traffic mirroring function means that a copy of a packet forwarded by the switch is sent to the traffic restoration module 16 for analysis.

In this embodiment of this application, after the detection device 10 receives a first sample file, the scheduling module 11 allocates the first virtual operating environment to run the first sample file. In a running process of the first sample file, the first virtual operating environment adds an identifier of the first sample file to a first HTTP request sent by the first sample file to the server 20, to obtain a second HTTP request, and then sends the second HTTP request to the server 20. In this way, when sending the second HTTP request to the server 20, the detection device 10 establishes a correspondence between a data flow identifier of the first HTTP request and the identifier of the first sample file. The correspondence is used to identify a subsample file of the first sample file from a subsequently transmitted data flow between the first virtual operating environment and the server. When the detection device 10 receives the subsequently transmitted data flow between the first virtual operating environment and the server, the detection device 10 determines, based on the correspondence between the data flow identifier of the first HTTP request and the identifier of the first sample file, that the subsequently transmitted data flow carries the subsample file of the first sample file. The detection device 10 allocates the subsample file of the first sample file to another module for detection using the scheduling module 11, to obtain a detection result of the subsample file. For example, the scheduling module 11 sends the subsample file to a virtual operating environment suitable for the subsample file such that the detection device 10 can obtain a behavior sequence generated in a running process of the subsample file in the virtual operating environment. Alternatively, the scheduling module 11 sends the subsample file to the static detection module 13, the antivirus engine scanning module 14, and the like, to obtain a multi-dimensional detection result of the subsample file. Further, the detection device 10 associates the first sample file serving as a parent sample file with the detection result of the subsample file, and detects, using the detection result of the subsample file, whether the parent sample file is a malicious file in order to improve accuracy of detecting a malicious file including a parent sample file and at least one subsample file. If the detection result of the subsample file reflects that the subsample of the first sample file has some malicious features, for example, the subsample file presents malicious behavior during running, it is determined that the first sample file is a malicious file.

Figure 4A:
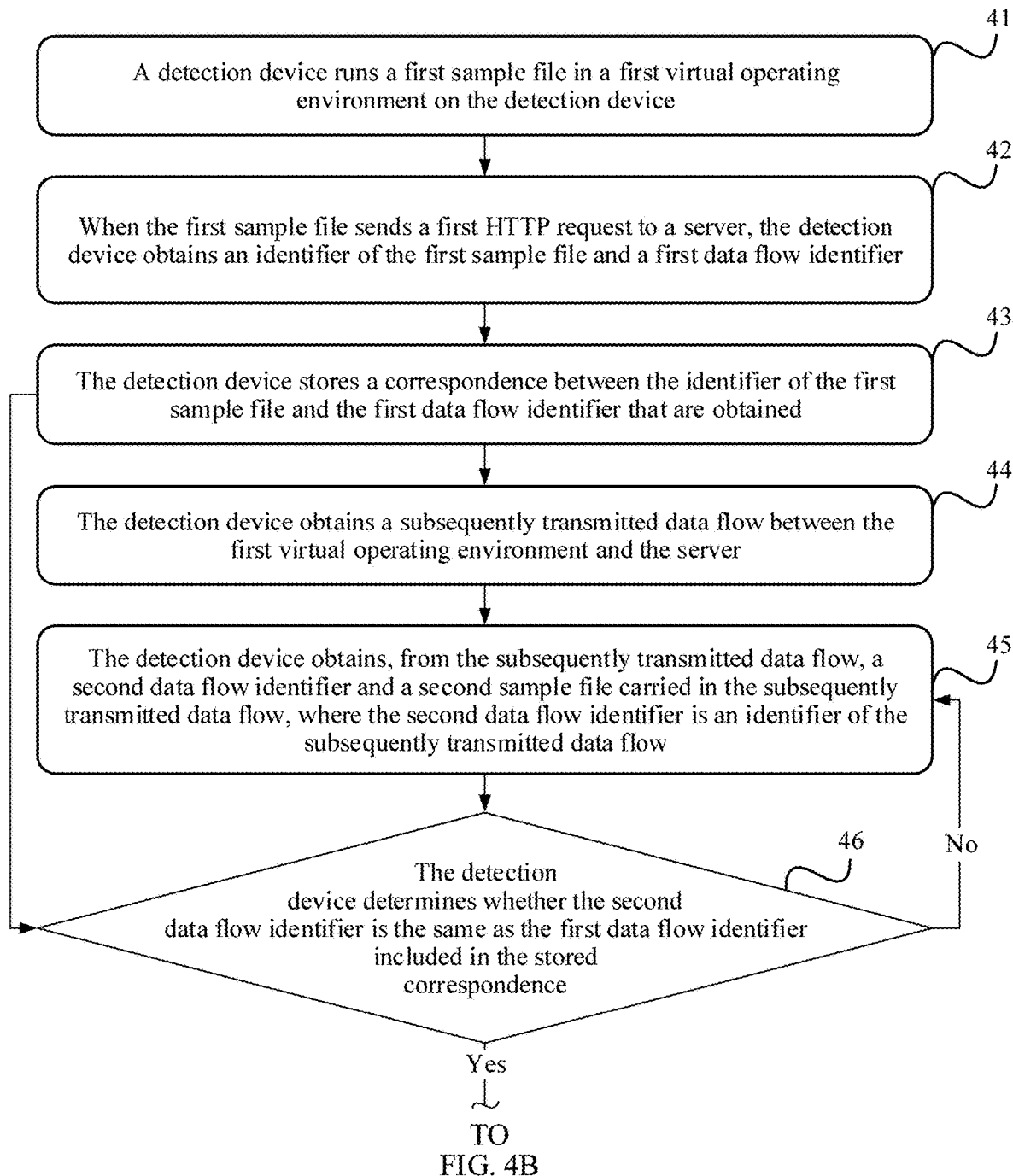
FIG. 4A and FIG. 4B are a flowchart of a malicious file detection method according to an embodiment of this application.
Figure 4B:
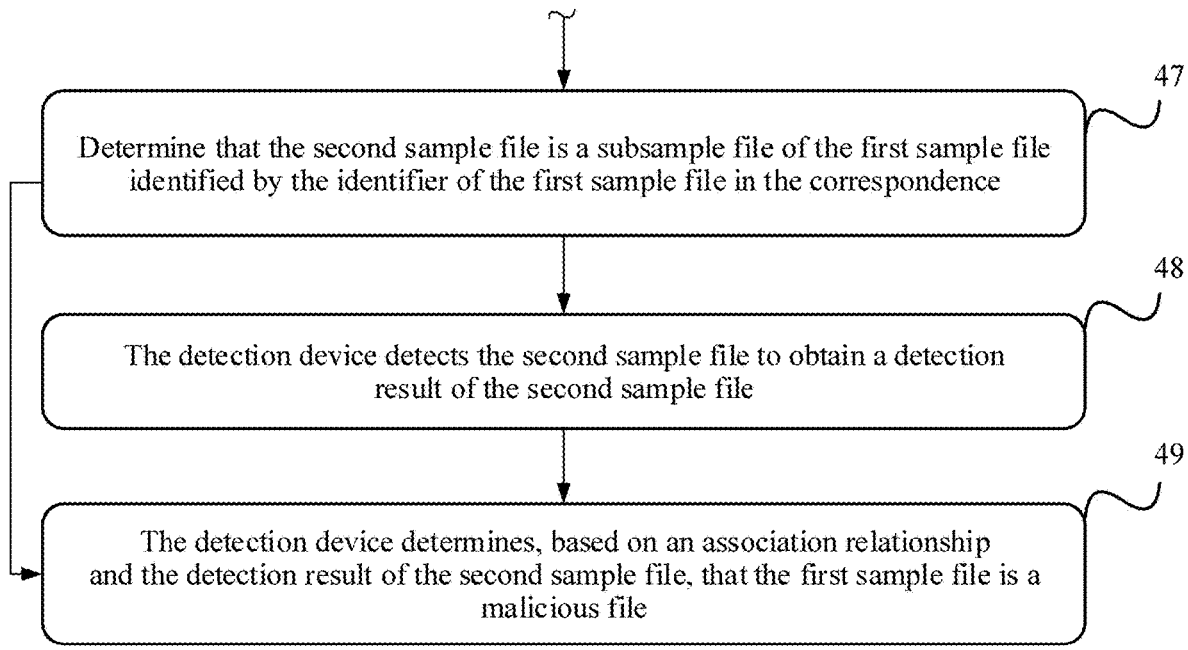

For a detailed process of how the detection device detects the sample file in FIG. 1, refer to the following flowchart shown in FIG. 4A and FIG. 4B and related descriptions.

Figure 3:
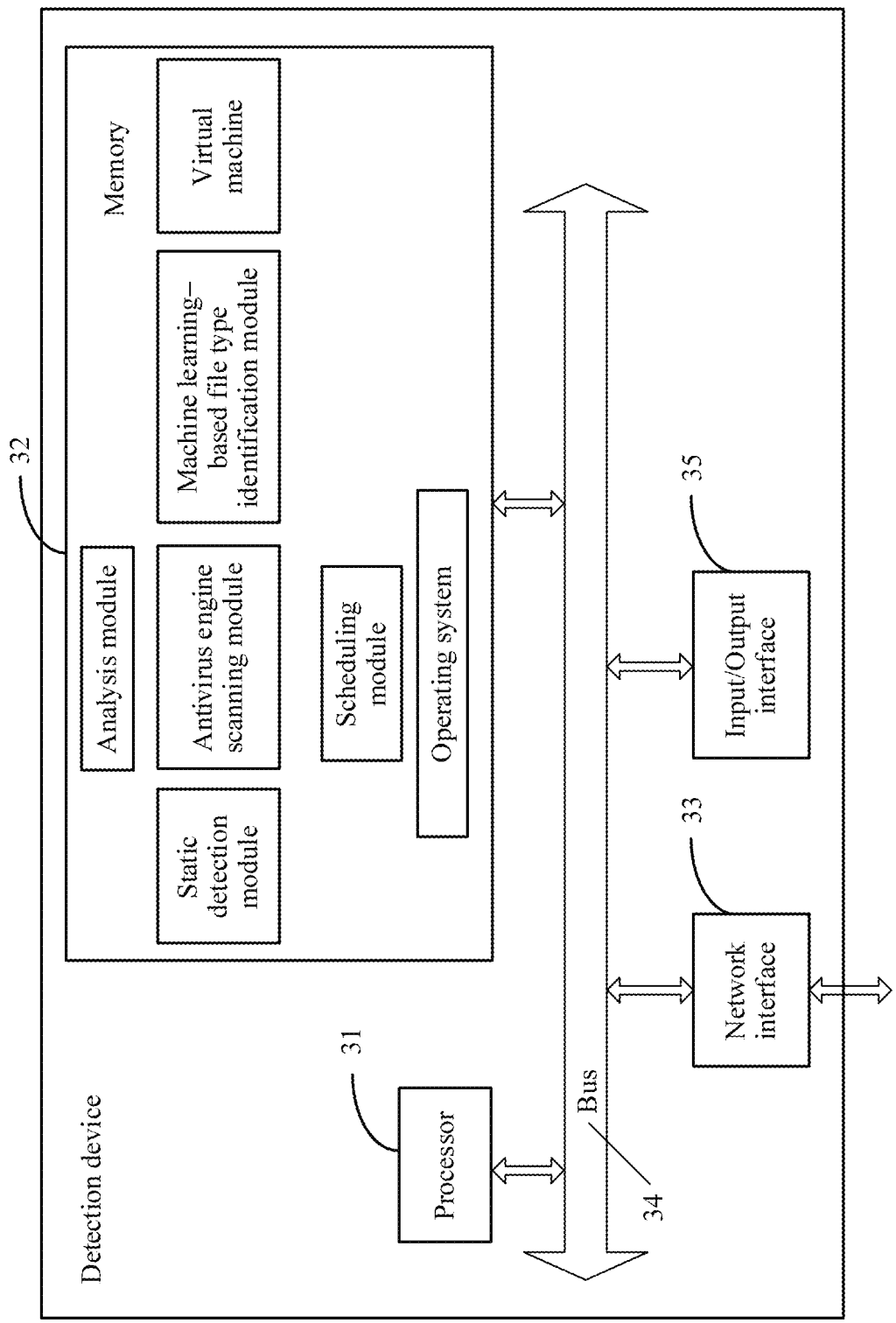
FIG. 3 is a schematic structural diagram of a detection device according to an embodiment of this application.

FIG. 3 is a schematic structural diagram of a detection device according to an embodiment of this application. The detection device shown in FIG. 3 includes at least one processor 31, a memory 32, and a network interface 33. The processor 31, the memory 32, and the network interface 33 are connected to each other using a bus 34.

The at least one processor 31 may be one or more central processing units (CPU). The CPU may be a single-core CPU, or may be a multi-core CPU.

The memory 32 includes but is not limited to a random-access memory (RAM), a read-only memory (ROM), an erasable programmable ROM (EPROM), or a compact disc ROM (CD-ROM).

The network interface 33 may be a wired interface such as a fiber distributed data interface (FDDI) or a gigabit Ethernet (GE) interface, or the network interface 33 may be a wireless interface.

Optionally, the detection device in FIG. 3 further includes an input/output interface 35. The input/output interface 35 is configured to receive a sample file entered by a user, and display a detection result of the sample file to the user, that is, whether the sample file is a malicious file or a probability that the sample file is a malicious file.

The processor 31 is configured to, after reading program code stored in the memory 32, generate a first virtual operating environment and a second virtual operating environment, and implement functions of the logical modules shown in FIG. 1. For example, when the traffic restoration module 16 shown in FIG. 1 and another logical module are integrated into a same host, the processor 31 implements functions of the traffic restoration module 16, the scheduling module 11, the static detection module 13, the antivirus engine scanning module 14, the machine learning-based file type identification module 15, the virtual machine 121, the virtual machine 122, and the analysis module 17 in FIG. 1.

When the traffic restoration module 16 shown in FIG. 2 is implemented by another independent device, the processor 31 is configured to, after reading program code stored in the memory 32, generate a first virtual operating environment and a second virtual operating environment, and implement functions of the scheduling module 11, the static detection module 13, the antivirus engine scanning module 14, the machine learning-based file type identification module 15, the virtual machine 121, the virtual machine 122, and the analysis module 17 shown in FIG. 2. In addition, the processor 31 communicates with the traffic restoration device 40 in FIG. 2 using the network interface 33, and receives information sent by the traffic restoration device 40.

In other words, the processor 31 is configured to, after reading the program code stored in the memory 32, perform a malicious file detection method according to an embodiment of this application. For a detailed process of how the detection device detects the sample file, refer to the following flowchart shown in FIG. 4A and FIG. 4B and related descriptions.

The following mainly describes, with reference to the scenario shown in FIG. 1, a malicious file detection method according to an embodiment of this application using the flowchart shown in FIG. 4A and FIG. 4B.

Step 41. A detection device runs a first sample file in a first virtual operating environment on the detection device.

Optionally, the scheduling module 11 in FIG. 1 allocates the first sample file to a first virtual machine for processing based on an extension and/or file header information of the first sample file. The first virtual machine is one of the two virtual machines the virtual machine 121 and the virtual machine 122 in FIG. 1. It is assumed that the virtual machine 121 is a virtual machine of a 32-bit WINDOWS operating system, and the virtual machine 122 is a virtual machine of a 64-bit WINDOWS operating system.

The first sample file is a script file or an executable file. The script file may be compiled in VISUAL BASIC language or in a POWERSHELL environment. In this embodiment, an example in which the first sample file is nk.vbs is used, and nk.vbs is a simple small script file compiled in the VISUAL BASIC language. Because nk.vbs can be run in the 32-bit WINDOWS operating system, the scheduling module 11 allocates nk.vbs to the virtual machine 121 for running. In this embodiment, the first virtual machine is the virtual machine 121.

In this application, the first sample file and a second sample file mentioned below do not represent a sequence relationship, but are intended to distinguish between different sample files. "First", "second", and the like mentioned below are also intended to distinguish between different data flow identifiers and the like.

Step 42. When the first sample file sends a first HTTP request to a server, the detection device obtains an identifier of the first sample file and a first data flow identifier.

After the first sample file is run in the first virtual machine, the first virtual machine is triggered to send the first HTTP request to the server. For example, the first sample file is embedded into an email as an attachment. After the first sample file is opened by a user, the first sample file starts a browser program, and sends the first HTTP request to the server. The first HTTP request carries a uniform resource locator (URL) of a second sample file. In this application, an HTTP proxy module is implanted in an operating system of each virtual machine. The HTTP proxy module is configured to, before the virtual machine sends a first HTTP packet to the server using a virtual network interface card, intercept a first HTTP request sent to the server located in the internet by an executable file or a script that is run in the first virtual machine, and fill, into a specified field in a packet header of the first HTTP request, an identifier generated by the first virtual machine for the executable file or the script that sends the first HTTP request, to obtain a second HTTP request. For example, in this embodiment, the HTTP proxy module fills the identifier generated by the first virtual machine for the first sample file into an extension field in the packet header of the first HTTP request, for example, an message digest 5 (MD5) field in FIG. 6.

Optionally, the identifier of the first sample file may be an MD5 value of content of the first sample file. A specific method for generating an identifier is not limited, provided that it can be ensured that the identifier can be used to distinguish between the first sample file and another file in the first virtual machine. Then, the HTTP proxy module sends an HTTP request carrying the identifier of the first sample file.

Figure 5:
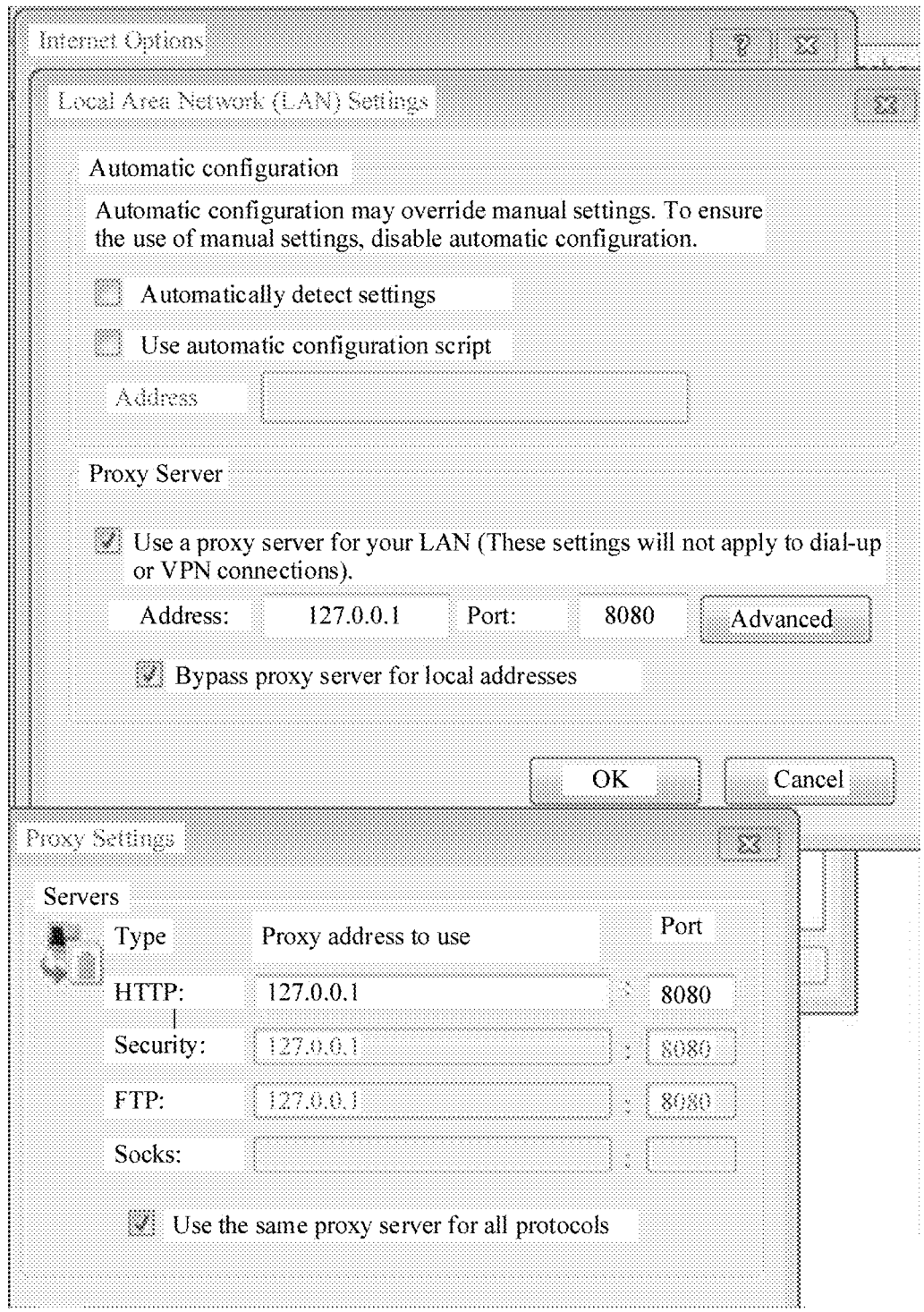
FIG. 5 is a schematic diagram of configuring an HTTP proxy module in a WINDOWS operating system according to an embodiment of this application.

The HTTP proxy module may be implanted in the operating system in a plurality of manners, and a specific manner is related to an operating system type and version. A WINDOWS operating system is used as an example, and the HTTP proxy module may be generated after application software installed in the virtual machine is run. The application software hooks (HOOK) an event that is in a Transfer Control Protocol (TCP)/Internet Protocol (IP) protocol stack and that is used to process an HTTP packet, to intercept the to-be-sent first HTTP request and add the identifier of the first sample file to the intercepted first HTTP request. The second HTTP request including the identifier of the first sample file is submitted to the TCP/IP protocol stack for subsequent processing. In the WINDOWS operating system, the functions of the HTTP proxy module may also be implemented by configuring a parameter of an INTERNET EXPLORER (IE) browser. The HTTP proxy module listens on a default HTTP port such as a port 8080 or a port 80 at a local network address 127.0.0.1. As shown in FIG. 5, "Local Area Network (LAN) Settings" in "Connection" is clicked in a tab bar "Internet Options" of the IE browser, "Use a proxy server for the LAN" and "Not use a proxy server for a local address" are selected in a tab page "Local Area Network (LAN) Settings", and "127.0.0.1" is filled in an address bar and "8080" is filled in a port bar. Further, in a pop-up page of "Advanced Options", a proxy server address used by an HTTP server is set to "127.0.0.1" and a port is "8080". A layout and content of a configuration page of the IE browser in the WINDOWS operating system may vary with an operating system version. FIG. 5 is merely used as an example.

FIG. 6 is a schematic diagram of field content of an HTTP request carrying an identifier of a first sample file according to an embodiment of this application. The identifier of the first sample file is the MD5 field in FIG. 6, that is, the MD5 value 02857a690225a12ba703bea6deea2217 of nk.vbs.

Optionally, the detection device may obtain the identifier of the first sample file in a plurality of manners.

Manner 1. The detection device obtains the identifier of the first sample file from the second HTTP request using a VMM.

Specifically, the VMM in the detection device simulates one virtual network interface card for each virtual machine, and virtual network interface cards of a plurality of virtual machines may constitute one virtual network. From the perspective of each virtual machine, the virtual machine has an independent network interface card, that is, a virtual network interface card. A packet exchanged between each virtual machine and another network device needs to be processed by the VMM and the operating system of the detection device. A packet sent by each virtual machine needs to be sequentially processed by the VMM and the operating system of the detection device, and then is sent to a network using a network interface of the detection device, for example, a physical network interface card. For a packet received by the virtual machine, after the physical network interface card of the detection device receives the packet, the operating system of the detection device and the VMM sequentially perform processing corresponding to the foregoing processing, and then send the packet to the virtual machine serving as a destination party of the packet.

In this embodiment, for an HTTP request sent by a virtual machine, the operating system of the detection device receives, using the VMM, the second HTTP request sent by the first virtual machine, and obtains the identifier of the first sample file and the first data flow identifier from the second HTTP request. In this embodiment, to distinguish between different data flows, an identifier of a data flow that is carried in the first HTTP request is referred to as the first data flow identifier. As described above, the identifier of the first sample file in the second HTTP request is added by the first virtual machine (the virtual machine 121) to the first HTTP request. An identifier of a data flow may be a 5-tuple including a source IP address, a source port, a destination IP address, a destination port, and a protocol number. The first data flow identifier is obtained by the operating system of the detection device by performing protocol parsing on a TCP/IP packet header of the second HTTP request. For a field structure definition of the TCP/IP packet header, refer to the related request for comments (RFC) 793. Details are not described herein.

Different network devices have different response policies for a packet carrying content of an extension field. For example, it is considered by default that some network devices fail to make a response, as long as content of one field in a received packet cannot be identified. On the contrary, some network devices can respond, in an existing manner, to a packet carrying content of an extension field, as long as content of some specified fields in the packet can be identified. Another network device possibly cannot correctly perform protocol parsing on the second HTTP request carrying the identifier of the first sample file. For example, the server cannot normally respond to the second HTTP request carrying the identifier of the first sample file. Therefore, to reduce a response failure rate, after obtaining the identifier of the first sample file from the second HTTP request through protocol parsing, the operating system of the detection device may further delete the identifier of the first sample file in the second HTTP request, to obtain the first HTTP request, and send the first HTTP request to the server. FIG. 6 is still used as an example. The operating system of the detection device deletes the value of the MD5 field, and then sends the first HTTP request that does not include the identifier of the first sample file to the server using the physical network interface card.

Manner 2. The detection device obtains the identifier of the first sample file based on mirrored traffic sent by a switch.

When the first sample file is run in the first virtual machine, the first virtual machine is triggered to send the first HTTP request to the server, and the first virtual machine adds the identifier allocated to the first sample file to the first HTTP request, to obtain the second HTTP request. The VMM and the operating system of the detection device in FIG. 1 forward the second HTTP request to the switch according to an existing packet processing procedure. The switch in FIG. 1 also performs port mirroring on the second HTTP request sent by the detection device, and sends, to the traffic restoration module 16 of the detection device, a mirrored packet of the second HTTP request sent by the detection device. The traffic restoration module 16 in FIG. 1 parses a packet header of the mirrored packet of the second HTTP request shown in FIG. 6, to obtain the identifier of the first sample file and the first data flow identifier.

Compared with the manner 1, the second HTTP request sent by the detection device to the network carries the identifier of the first sample file, and a response failure rate may be slightly higher. However, the operating system of the detection device does not need to perform additional processing on the second HTTP request, for example, does not need to perform protocol parsing to obtain the identifier of the first sample file and the first data flow identifier, and remove the identifier of the first sample file in the second HTTP request. Therefore, load of the operating system of the detection device is reduced.

Step 43. The detection device stores a correspondence between the identifier of the first sample file and the first data flow identifier that are obtained in step 42.

In a specific example, the identifier of the first sample file nk.vbs that is obtained by the detection device is 02857a690225a12ba703bea6deea2217, and the first data flow identifier includes at least a 5-tuple<source IP address (192.168.122.22), source port (3000), destination IP address (1.1.1.1), destination port (3000), and protocol number (TCP)>. The source IP address 192.168.122.22 is an IP address of the first virtual machine, and the source port number 3000 is a port number of the first virtual machine. The destination IP address 1.1.1.1 is an IP address of the server, and the destination port number 3000 is a port number of the server.

Optionally, as shown in Table 2, the detection device adds a correspondence record to a memory.

TABLE 2

| | Data flow identifier | | | | | |
|---|---|---|---|---|---|---|
| Sequence number | Source IP address | Source port number | Destination IP address | Destination port number | Protocol number | Identifier of a sample file |
| 1 | 192.168.122.22 | 3000 | 1.1.1.1 | 3000 | TCP | 02857a690225a12ba703bea6deea2217 |
| ... | ... | ... | ... | ... | ... | ... |

Step 44. The detection device obtains a subsequently transmitted data flow between the first virtual operating environment and the server.

In this field, a data flow (or referred to as a packet flow) is a series of packets from a source host to a destination party, and the destination party may be another host, a multicast group including a plurality of hosts, or a broadcast domain. In this embodiment of this application, the subsequently transmitted data flow between the first virtual operating environment and the server is a TCP data flow sent by the first virtual machine to the server, or a TCP data flow sent by the server to the first virtual machine.

The switch in FIG. 1 performs port mirroring on a TCP data flow sent by the detection device or a TCP data flow sent to the detection device, and sends the mirrored traffic to the traffic restoration module 16 of the detection device. When configuring the virtual machine, the detection device may learn of the IP address of the first virtual machine. Therefore, the detection device performs screening on traffic in the mirrored traffic based on the IP address, to obtain a TCP data flow sent by the first virtual machine or a TCP data flow sent to the first virtual machine, and performs subsequent processing shown in step 45 on the traffic obtained after the screening.

Optionally, to reduce processing resources and memory resources consumed for traffic restoration, the traffic restoration module 16 may perform screening only on traffic received after the correspondence record shown in Table 2 is created in the memory. During screening, a TCP data flow sent by the first virtual machine to the server or a TCP data flow sent by the server to the first virtual machine is obtained, and subsequent processing shown in step 45 is performed on the mirrored traffic obtained after the screening.

Step 45. The detection device obtains, from the subsequently transmitted data flow, a second data flow identifier and a second sample file carried in the subsequently transmitted data flow, where the second data flow identifier is an identifier of the subsequently transmitted data flow.

The traffic restoration module 16 in FIG. 1 stores the mirrored traffic obtained after the screening, and obtains, using a traffic restoration technology, all packets of each data flow and a file carried in each data flow. The traffic restoration technology is a process of obtaining, from a series of packets included in a data flow, files transmitted using payload content of the series of packets. For example, the traffic restoration module 16 sorts a plurality of packets included in a same data flow in a sequence of sequence numbers based on control information in a packet header of each packet, for example, a timestamp, a source port, a destination port, a sequence number, an acknowledgement number, a checksum, and a window size, and reassembles, corrects, and decodes data payloads of the plurality of sorted packets based on offsets, to obtain a sample file carried in the data flow. Optionally, for a sample file transmitted using an HTTP data flow, a transmission start point, a transmission end point, and the like of the sample file may be determined based on feature characters such as "GET", "POST", "HEAD", "HTTP", and "FIN" in packet payload content. For specific details of data flow reassembly, refer to existing technical documents. Details are not described herein.

The traffic restoration module 16 in FIG. 1 may further obtain a data flow identifier of each data flow in the mirrored traffic through protocol parsing.

In the foregoing manner, for each data flow in the mirrored traffic, the traffic restoration module 16 obtains a data flow identifier of the data flow and a sample file carried in the data flow. For example, information obtained by the traffic restoration module 16 using the traffic restoration technology is shown in Table 3. Each row of record in Table 3 represents information about one data flow. Specifically, the information about the data flow includes a data flow identifier and a file carried in a data flow represented by the data flow identifier. For brevity, a file is replaced with a file name in Table 3.

Table 2 and Table 3 are still used as an example. The traffic restoration module 16 of the detection device in FIG. 1 sequentially reads a row of record from Table 3, and uses the read record as information about the subsequently transmitted data flow. The traffic restoration module 16 compares a data flow identifier in the record read from Table 3 with a data flow identifier in Table 2. If the data flow identifier in the record read from Table 3 is the same as the data flow identifier in Table 2, it indicates that a file in the record read from Table 3 is downloaded from the network by a file recorded in Table 2. In other word, a file indicated by a file name in the record read from Table 3 is a subsample file of a file indicated by a file identifier in Table 2. For example, the traffic restoration module 16 reads the first row of record from Table 3, and compares a data flow identifier in the first row of record in Table 3 with a data flow identifier recorded in Table 2. Because the data flow identifier in the first row of record in Table 3 is the same as the data flow identifier recorded in Table 2, a file indicated by a file identifier fad123.exe in the first row of record in Table 3 is a subsample file of a file nk.vbs indicated by "02857a690225a12ba703bea6deea2217".

Then, the traffic restoration module 16 reads the second row of record from Table 3, and compares a data flow identifier in the second row of record in Table 3 with a data flow identifier recorded in Table 2. Because the data flow identifier in the second row of record in Table 3 is different from the data flow identifier recorded in Table 2, the detection device determines that a file indicated by a file identifier Guideline.doc in the second row of record in Table 3 is unrelated to the file nk.vbs indicated by "02857a690225a12ba703bea6deea2217". The traffic restoration module 16 sequentially reads all records in Table 3 to perform the foregoing comparison processing until all the records in Table 3 are read.

After determining the association relationship, the traffic restoration module 16 in FIG. 1 sends a sample submission request to the scheduling module 11. The sample submission request carries the second sample file, and is used to request

TABLE 3

| | Data flow identifier | | | | | |
|---|---|---|---|---|---|---|
| Sequence number | Source IP address | Source IP port | Destination IP address | Destination IP port | Protocol number | File name |
| 1 | 192.168.122.22 | 3000 | 1.1.1.1 | 3000 | TCP | fad123.exe |
| 2 | 192.168.122.22 | 3500 | 2.2.2.2 | 4000 | TCP | Guideline.doc |
| ... | ... | ... | ... | ... | ... | ... |

Step 46. The detection device determines whether the second data flow identifier is the same as the first data flow identifier included in the correspondence stored in step 44, and if the second data flow identifier is the same as the first data flow identifier included in the correspondence, performs step 47, in an embodiment, determines that the second sample file is a subsample file of the first sample file identified by the identifier of the first sample file in the correspondence, that is, determines an association relationship between files.

If the second data flow identifier is different from the first data flow identifier included in the correspondence, the detection device returns to perform step 45, in an embodiment, continues to perform traffic restoration on the subsequently transmitted data flow, or obtains another record from Table 3 to compare the record with a record in Table 2.

the scheduling module 11 to detect the second sample file. Optionally, the traffic restoration module 16 notifies the analysis module 17 of the association relationship such that the analysis module 17 analyzes, based on the association relationship, detection results obtained by running the first sample file and the second sample file. The traffic restoration module 16 may also add the second sample file and the association relationship to the sample submission request, and the scheduling module 11 notifies the analysis module 17 of the association relationship. In conclusion, it is necessary to ensure that the scheduling module 11 can receive the second sample file, and the analysis module 17 can learn of the association relationship.

For example, the sample submission request carries information indicating a file fad123.exe and "fad123.exe is a subsample file of a file indicated by" 02857a690225a12ba703bea6deea2217 " ".

For example, a format of the sample submission request sent by the traffic restoration module 16 in FIG. 1 to the scheduling module 11 is as follows:

```
POST /sample HTTP/1.1 /*Sample submission request is an HTTP POST request*/
    Content-Type: multipart/form-data; /*Format of content of the sample submission
request*/
    Content-Length: 1000 /*Length of content of the sample submission request*/
    Content-Disposition: form-data; name="file_name" /*Name of a submitted sample
file*/
    sample_a.exe
    Content-Disposition: form-data; name="sample_md5"/*MD5 value of a submitted
sample file*/
    09087ab90225a12ba703bea6deea2217
    Content-Disposition: form-data; name="file_content"/*Content of a submitted sample
file*/
    ...The content of sample...
    Content-Disposition: form-data; name="parent_md5"/*MD5 value of a parent sample
file of a submitted sample file, which may be empty*/
    02857a690225a12ba703bea6deea2217.
```

Step 48. The detection device detects the second sample file to obtain a detection result of the second sample file.

Optionally, the detection device performs at least one of the following detection on the second sample file.

(1) The detection device runs the second sample file in a second virtual operating environment on the detection device, to obtain a behavior sequence generated by running the second sample file.

(2) The detection device performs static detection on the second sample file.

(3) The detection device performs antivirus engine scanning on the second sample file.

(4) The detection device performs machine learning-based file type identification on the second sample file.

The detection device may flexibly set a type of detection that needs to be performed on the second sample file. Optionally, the detection device may set a corresponding detection type based on a file type of the second sample file. For example, if the second sample file is an ".exe" file, the scheduling module 11 in FIG. 1 allocates a second virtual machine to run the second sample file, to obtain the behavior sequence of the second sample file. If the second sample file is a PE file, the scheduling module 11 in FIG. 1 performs static detection and antivirus engine scanning on the second sample file. The detection device may further set a corresponding detection type based on current resource usage. For example, if current CPU usage is less than 50%, the scheduling module 11 in FIG. 1 controls to perform the foregoing four kinds of detection on the second sample file. In this way, detection comprehensiveness and accuracy can be improved. If current CPU usage is greater than 50%, the scheduling module 11 in FIG. 1 performs only two kinds of detection (1) and (3) on the second sample file. In this way, detection efficiency can be improved.

In the detection device, the second virtual machine configured to run the second sample file and the first virtual machine configured to run the first sample file may be a same virtual machine, or may be different virtual machines. For example, if the first sample file and the second sample file may be run in a same operating environment, the scheduling module 11 in the detection device may allocate a same virtual machine to run the first sample file and the second sample file. If the first sample file and the second sample file need to be run in different operating environments, the scheduling module 11 in the detection device may allocate different virtual machines to separately run the first sample file and the second sample file.

In the foregoing example, the file fad123.exe needs to be run in a 64-bit WINDOWS operating system, and therefore the scheduling module 11 in the detection device allocates the file fad123.exe to the virtual machine 122 in FIG. 1 for running. In this example, the second virtual machine is the virtual machine 122.

Step 49. The detection device determines, based on the association relationship and the detection result of the second sample file, that the first sample file is a malicious file.

If the scheduling module 11 in FIG. 1 allocates the second virtual machine to run the second sample file, the second virtual machine sends the behavior sequence obtained in the running process of the second sample file in the second virtual machine to the analysis module 17. The analysis module 17 determines, based on the association relationship and the behavior sequence generated by running the second sample file, whether the first sample file is a malicious file.

For example, after the first sample file nk.vbs is run in the virtual machine 121 in FIG. 1, the virtual machine 121 sends the obtained behavior sequence to the analysis module 17. The analysis module 17 matches the behavior sequence generated by running the first sample file with a dynamic behavior feature of a known malicious file, and determines that the behavior sequence generated by running the first sample file includes no dynamic behavior feature of the known malicious file. In addition, the scheduling module 11 separately sends the first sample file nk.vbs to the static detection module 13, the antivirus engine scanning module 14, and the machine learning-based file type identification module 15 for detection. Results of detection performed by the static detection module 13, the antivirus engine scanning module 14, and the machine learning-based file type identification module 15 on the first sample file nk.vbs are all normal.

After the second sample file fad123.exe is run in the virtual machine 122, the virtual machine 122 sends the obtained behavior sequence to the analysis module 17. In the running process of fad123.exe in the virtual machine 122, three dynamic link libraries skip1.dll, killpr.dll, and deleteitem.dll are released and loaded. In other words, the behavior sequence generated by running fad123.exe in the virtual machine 122 is "load skip.dll, load killpr.dll, load deletee.dll". The analysis module 17 matches the behavior sequence generated by running fad123.exe with the dynamic behavior feature of the known malicious file, and determines that the behavior sequence generated by running fad123.exe includes the dynamic behavior feature of the known malicious file.

In addition, the scheduling module 11 separately sends the second sample file fad123.exe to the static detection module 13, the antivirus engine scanning module 14, and the machine learning-based file type identification module 15 for detection. Results of detection performed by the static detection module 13 and the machine learning-based file type identification module 15 on fad123.exe are both normal, but a result of detection performed by the antivirus engine scanning module 14 on fad123.exe is abnormal.

When a detection result of at least one detection manner is abnormal, the analysis module 17 determines that a detected file is a malicious file. The analysis module 17 associates nk.vbs with the detection result of fad123.exe. Because a result of dynamic behavior detection performed on fad123.exe and the result of detection performed by the antivirus engine scanning module 14 on fad123.exe are abnormal, the analysis module 17 determines that nk.vbs is a malicious file. Further, the analysis module 17 may determine that a file package including the parent file nk.vbs and the sub-file fad123.exe is a malicious file.

In other approaches, because it cannot be ensured that a behavior sequence of a subsample file can be obtained, and an association relationship between a parent sample file and a subsample file cannot be established, a dynamic behavior detection result of the subsample file cannot be associated with the parent sample file, and a malicious file including a parent sample file and a subsample file cannot be accurately detected. In the malicious file detection method provided in this embodiment of this application, the detection device intercepts an HTTP request that is sent by a parent sample file and that carries an identifier of the parent sample file, and in a process of downloading a subsample file by the parent sample file, establishes an association relationship between the parent sample file and the subsample file, to separately select proper operating environments to run the parent sample file and subsample file. In this way, it is ensured that a behavior sequence of the subsample file can be obtained. In addition, the parent sample file can be associated with a dynamic behavior detection result of the subsample file, and it is detected, using behavior presented in a running process of the subsample file, whether the parent sample file is a malicious file. Therefore, accuracy of detecting a malicious file including a parent sample file and at least one subsample file is improved.

Figure 7:
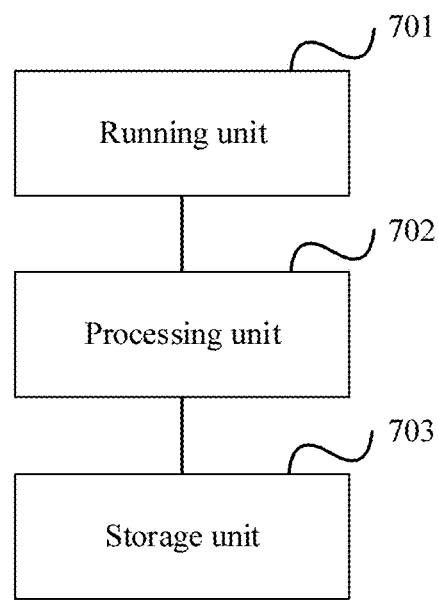
FIG. 7 is a schematic structural diagram of a malicious file detection apparatus according to an embodiment of this application.

Correspondingly, an embodiment of the present disclosure further provides a malicious file detection apparatus. As shown in FIG. 7, the apparatus includes a running unit 701, a processing unit 702, and a storage unit 703, which are specifically as follows.

The running unit 701 is configured to provide a first virtual operating environment, and run a first sample file in the first virtual operating environment. As described in the foregoing embodiment, the virtual operating environment may be a virtual machine.

The processing unit 702 is configured to, when the first sample file sends a first HTTP request to a server, obtain an identifier of the first sample file and a first data flow identifier. The first HTTP request is used to request a subsample file from the server, the identifier of the first sample file is generated by the first virtual operating environment for the first sample file, and the first data flow identifier is a data flow identifier of the first HTTP request.

The storage unit 703 is configured to store a correspondence between the identifier of the first sample file and the first data flow identifier.

The processing unit 702 is further configured to obtain a subsequently transmitted data flow between the first virtual operating environment and the server, obtain, from the subsequently transmitted data flow, a second data flow identifier and a second sample file carried by the subsequently transmitted data flow, where the second data flow identifier is an identifier of the subsequently transmitted data flow, if the second data flow identifier is the same as the first data flow identifier in the correspondence, determine that an association relationship is that the second sample file is a subsample file of the first sample file identified by the identifier of the first sample file in the correspondence, detect the second sample file to obtain a detection result of the second sample file, and determine, based on the association relationship and the detection result of the second sample file, that the first sample file is a malicious file.

The running unit 701 and the processing unit 702 are configured to implement functions of the processor 31 in the detection device shown in FIG. 3 in the foregoing embodiment. The storage unit 703 is configured to implement a function of the memory 32 in the detection device shown in FIG. 3 in the foregoing embodiment. For detailed function details and working procedures of the running unit 701, the processing unit 702, and the storage unit 703, refer to the detailed descriptions in the foregoing embodiments. Details are not described herein again. All or some of these units may be implemented using software, hardware, firmware, or any combination thereof. When the software is used for implementation, all or some of these units may be implemented in a form of a computer program product. The computer program product includes one or more computer instructions. When the computer program instructions are loaded and executed on the computer, all or some of the procedures or functions according to the embodiments of the present disclosure are generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person skilled in the art can make various modifications and variations to the present disclosure without departing from the scope of the present disclosure. The present disclosure is intended to cover these modifications and variations provided that they fall within the scope of protection defined by the following claims.

What is claimed is:

1. A non-transitory computer readable medium storing computer executable instructions that when executed in a processor comprised in a detection device performs:

running a first sample file in a first virtual operating environment on the detection device;

obtaining an identifier of the first sample file and a first data flow identifier when the first sample file sends a first Hypertext Transfer Protocol (HTTP) request to a server, wherein the first HTTP request requests a subsample file from the server, wherein the identifier is from the first virtual operating environment, and wherein the first data flow identifier identifies the first HTTP request;
storing a correspondence between the identifier and the first data flow identifier;
obtaining a subsequently transmitted data flow between the first virtual operating environment and the seer;
obtaining, from the subsequently transmitted data flow, a second data flow identifier and a second sample file, wherein the second data flow identifier identifies the subsequently transmitted data flow,
determining that an association relationship is that the second sample file is a subsample file of the first sample file identified by the identifier when the second data flow identifier is the same as the first data flow identifier;
detecting the second sample file to obtain a detection result of the second sample file; and
determining, based on the association relationship and the detection result, that the first sample file is a malicious file.

2. A malicious file detection method implemented by a detection device, comprising:
running a first sample file in a first virtual operating environment on the detection device;
obtaining an identifier of the first sample file and a first data flow identifier when the first sample file sends a first Hypertext Transfer Protocol (HTTP) request to a server, wherein the first HTTP request requests a subsample file from the server, wherein the identifier is from the first virtual operating environment, and wherein the first data flow identifier identifies the first HTTP request;
storing a correspondence between the identifier and the first dataflow identifier;
obtaining a subsequently transmitted data flow between the first virtual operating environment and the server;
obtaining, from the subsequently transmitted data flow, a second data flow identifier and a second sample file, wherein the second data flow identifier identifies the subsequently transmitted data flow,
determining that an association relationship is that the second sample file is a subsample file of the first sample file identified by the identifier when the second data flow identifier is the same as the first data flow identifier;
detecting the second sample file to obtain a detection result of the second sample file; and
determining, based on the association relationship and the detection result, that the first sample file is a malicious file.

3. The malicious file detection method of claim 2, further comprising running the second sample file in a second virtual operating environment on the detection device to obtain a behavior sequence from running the second sample file.

4. The malicious file detection method of claim 3, further comprising:
performing parallel detection on the second sample file, wherein the parallel detection comprises at least one of static detection, antivirus engine scanning, or machine learning-based file type identification; and
recording a parallel detection result of the second sample file.

5. The malicious file detection method of claim 3, wherein the first virtual operating environment is a first virtual machine, wherein the second virtual operating environment is a second virtual machine, and wherein the malicious file detection method further comprises:
receiving the first HTTP request;
generating a second HTTP request based on the first HTTP request, wherein the second HTTP request comprises the first HTTP request and the identifier,
receiving the second HTTP request using a virtual machine monitor on the detection device; and
obtaining the identifier and the first data flow identifier from the second HTTP request.

6. The malicious file detection method of claim 5, wherein after obtaining the identifier of the first sample file and the first data flow identifier from the second HTTP request, the malicious file detection method further comprises:
deleting the identifier in the second HTTP request to obtain the first HTTP request, and
sending the first HTTP request to the server.

7. The malicious file detection method of claim 5, wherein before generating the second HTTP request, the malicious file detection method further comprises adding the identifier to the first HTTP request.

8. The malicious file detection method of claim 2, further comprising:
coupling to the server using a switch;
receiving mirrored traffic that is of subsequently transmitted traffic between the first virtual operating environment and the server and that is from the switch; and
obtaining the subsequently transmitted data flow from the mirrored traffic.

9. The malicious file detection method of claim 8, wherein the first virtual operating environment is a first virtual machine, wherein a second virtual operating environment is a second virtual machine, and wherein the malicious file detection method further comprises:
receiving the first HTTP request;
generating a second HTTP request based on the first HTTP request, wherein the second HTTP request comprises the first HTTP request and the identifier;
sending the second HTTP request to the server using the switch;
receiving a mirrored packet that is of the second HTTP request and that is from the switch; and
obtaining the identifier and the first data flow identifier from the mirrored packet.

10. The malicious file detection method of claim 2, wherein before running the first sample file in the first virtual operating environment, the malicious file detection method further comprises allocating the first sample file to the first virtual operating environment based on an extension or the file header information of the first sample file and wherein before running the second sample file in a second virtual operating environment, the malicious file detection method further comprises allocating the second sample file to the second virtual operating environment based on the extension or the file header information of the second sample file.

11. The malicious file detection method to claim 2, wherein the first sample file is an executable file or a file into which the executable file is embedded, and wherein the second sample file is the executable file or the file into which the executable file is embedded.

12. A detection device, comprising:
a processor; and
a memory coupled to the processor and configured to store instructions that, when executed by the processor, cause the detection device to be configured to:

generate a first virtual operating environment;
run a first sample file in the first virtual operating environment;
obtain an identifier of the first sample file and a first data flow identifier when the first sample file sends a first Hypertext Transfer Protocol (HTTP) request to a server, wherein the first HTTP request requests a subsample file from the server, wherein the identifier of the first sample file is from the first virtual operating environment for the first sample file, and wherein the first data flow identifier identifies the first HTTP request;
store a correspondence between the identifier of the first sample file and the first data flow identifier in the memory;
obtain a subsequently transmitted data flow between the first virtual operating environment and the server;
obtain a second data flow identifier and a second sample file carried in the subsequently transmitted data flow from the subsequently transmitted data flow wherein the second data flow identifier identifies the subsequently transmitted data flow;
determine that an association relationship is that the second sample file is a subsample file of the first sample file identified by the identifier of the first sample file in the correspondence when the second data flow identifier is the same as the first data flow identifier;
detect the second sample file to obtain a detection result of the second sample file; and
determine, based on the association relationship and the detection result, that the first sample file is a malicious file.

13. The detection device of claim 12, wherein the instructions further cause the detection device to be configured to:
generate a second virtual operating environment; and
run the second sample file in the second virtual operating environment; to obtain a behavior sequence from running the second sample file.

14. The detection device of claim 13, wherein the instructions further cause the detection device to be configured to:
perform parallel detection on the second sample file, wherein the parallel detection comprises at least one of static detection, antivirus engine scanning, or machine learning-based file type identification; and
record a parallel detection result of the second sample file.

15. The detection device of claim 13, wherein the first virtual operating environment is a first virtual machine, wherein the second virtual operating environment is a second virtual machine, wherein the first virtual machine receives the first HTTP request and generates a second HTTP request based on the first HTTP request, and the second HTTP request comprises the first HTTP request and the identifier of the first sample file, and wherein the instructions further cause the detection device to be configured to:
receive the second HTTP request using a virtual machine monitor on the detection device; and
obtain the identifier of the first sample file and the first data flow identifier from the second HTTP request.

16. The detection device of claim 15, wherein the instructions further cause the detection device to be configured to:
delete the identifier of the first sample file in the second HTTP request, to obtain the first HTTP request; and
send the first HTTP request to the server.

17. The detection device of claim 15, wherein the second HTTP request is obtained after an HTTP proxy module in the first virtual machine adds the identifier of the first sample file to the first HTTP request.

18. The detection device of claim 12, wherein the detection device further comprises a network interface coupled to the processor and configured to receive mirrored traffic of subsequently transmitted traffic between the first virtual operating environment and the server and that is from a switch, wherein the detection device and the server are coupled using the switch, wherein the instructions further cause the detection device to obtain the subsequently transmitted data flow from the mirrored traffic.

19. The detection device of claim 18, wherein the instructions further cause the detection device to be configured to:
generate a second virtual operating environment that is a second virtual machine, wherein the first virtual operating environment is a first virtual machine wherein the first virtual machine receives the first HTTP request, generates a second HTTP request based on the first HTTP request, and sends the second HTTP request to the server using the switch, wherein the second HTTP request comprises the first HTTP request and the identifier of the first sample file, and wherein the network interface is further configured to receive a mirrored packet of the second HTTP request and that is from the switch; and
obtain the identifier of the first sample file and the first data flow identifier from the mirrored packet of the second HTTP request.

20. The detection device of claim 12, wherein the instructions further cause the detection device to be configured to:
allocate the first sample file to the first virtual operating environment based on an extension or file header information of the first sample file;
generate a second virtual operating environment; and
allocate the second sample file to the second virtual operating environment based on the extension or the file header information of the second sample file.

* * * * *

UNITED STATES PATENT AND TRADEMARK OFFICE
CERTIFICATE OF CORRECTION

PATENT NO. : 11,836,253 B2
APPLICATION NO. : 17/030984
DATED : December 5, 2023
INVENTOR(S) : Li Li, Bingjian Zhao and Zehao Jiang It is certified that error appears in the above-identified patent and that said Letters Patent is hereby corrected as shown below:

In the Claims

Claim 1, Column 23, Line 11: "data flow," should read "data flow;"

Claim 2, Column 23, Line 41: "data flow," should read "data flow;"

Claim 5, Column 24, Line 6: "the identifier," should read "the identifier;"

Claim 6, Column 24, Line 17: "HTTP request, and" should read "HTTP request; and"

Claim 10, Column 24, Line 52: "file and wherein" should read "file, and wherein"

Claim 12, Column 25, Line 17: "and the server," should read "and the server;"

Claim 13, Column 25, Line 38: "environment; to obtain" should read "environment to obtain"

Signed and Sealed this
Thirteenth Day of February, 2024

Katherine Kelly Vidal
*Director of the United States Patent and Trademark Office*